FIG. 1

INVENTORS:
JOSEPH D. COCCOLI
JOHN R. LAWSON
BY Arthur A. Smith, Jr.
ATTORNEY

INVENTORS:
JOSEPH D. COCCOLI
JOHN R. LAWSON
BY *Arthur A. Smith, Jr.*
ATTORNEY

Sept. 20, 1971    J. D. COCCOLI ET AL    3,606,549
RING LASER INERTIAL ANGLE ENCODER
Filed April 14, 1969    11 Sheets-Sheet 4

INVENTORS.
JOSEPH D. COCCOLI
JOHN R. LAWSON
BY Arthur A. Smith, Jr.
ATTORNEY

INVENTORS:
JOSEPH D. COCCOLI
JOHN R. LAWSON
BY Arthur A. Smith, Jr.
ATTORNEY

3,606,549
RING LASER INERTIAL ANGLE ENCODER
Joseph D. Coccoli, Brighton, and John R. Lawson, Lincoln, Mass., assignors to Massachusetts Institute of Technology, Cambridge, Mass.
Filed Apr. 14, 1969, Ser. No. 815,786
Int. Cl. G01b 11/26
U.S. Cl. 356—152                                              10 Claims

ABSTRACT OF THE DISCLOSURE

A ring laser angle encoder which measures the angular difference in inertial positions of two targets and provides a highly accurate, continuous, digital readout thereof. The encoder comprises a rotatable ring laser maintained at a constant inertial angular rotation rate above a predetermined threshold value such as to generate a digital count directly proportional to the angle through which the laser has rotated; a scanner-photometer rigidly affixed to the laser and rotatable therewith about the laser's rotation axis, which converts the light intensity of each target scanned into an electrical signal having a frequency proportional thereto; and an estimator-detector circuit coupled to the output of the ring laser and the photometer, which estimates the center of each target scanned and records the laser's digital count (and fraction thereof) existing when each target center is scanned. The first target scanned is scanned and estimated again upon completion of a full rotation cycle of 360° for purposes of self-calibration. The resulting digital counts for the aforementioned three detections are combined to provide a digital output from the estimator-detector circuit which is a highly accurate indication of the angular difference between the two targets of interest.

---

The invention described herein was made in the performance of work under a National Aeronautics and Space Administration contract and is subject to the provisions of Section 305 of the National Aeronautics and Space Act of 1958, Public Law 85–568 (72 Stat. 435; 42 U.S.C. 4257).

BACKGROUND OF THE INVENTION

(1) Field of the invention

This invention relates generally to angular measuring systems and particularly to an inertial angle encoder utilizing a gas ring laser.

(2) Description of the prior art

There is a wide variety of systems known in the art for measuring the relative angular difference between two targets or points. For example, the term "angle encoder" is often used in the art to designate shaft position transducing devices which are designed to measure, and often to encode, positions of a shaft relative to some reference. In resolver applications a shaft position encoder, comprising a rotor and stator, is used such that the stator serves as the reference; and the object is to measure the angular difference at any moment between the position of the rotor relative to the stator. In a more generic sense the term "angle encoder" is sometimes used to designate sextants and other angular measuring devices using stellar inertial reference points. For geodetic and geophysical surveying applications, various types of sighting instruments, such as theodolites, are employed as angular measuring devices. The aforementioned angular measuring/encoding instruments may be electromechanical, electromagnetic, optical or various combinations thereof. In short, there are many types of angle encoders available in the art depending upon the particular application desired, the reqiured accuracy and other factors such as size, weight and equipment complexities.

The aforementioned angle encoders are somewhat limited in flexibility in the sense, for example, that the shaft position transducer cannot be used directly for stellar measurements or in the usual surveying work. Those devices, such as theodolites, which depend heavily on mechanical component tolerances and on visual sightings, have very definite accuracy limitations inherent therein. Further, relative to more accurate instruments, such as certain types of shaft position encoders or transducers, it has been become increasingly more difficult, and in some cases unfeasible, to design test standards or equipment having the accuracy and resolution necessary for precise calibration of such systems.

SUMMARY OF THE INVENTION

In view of the foregoing limitations in presently available angular encoders/measuring devices, it is a general object of the invention to provide a ring laser inertial angle encoder having an accuracy one to two orders of magnitude better than the most accurate of available encoders.

It is another object of the invention to provide a ring laser inertial angle encoder capable of measuring sequentially and with high precision the angular difference in inertial positions between two targets which are stationary or moving in a known manner.

It is yet another object of the invention to provide a ring laser inertial angle encoder capable of functioning interchangeably as a stellar angle measuring device, a shaft position encoder, a surveying instrument or in any other application where sequential angular measurements between two targets is permitted.

It is a still further object of the invention to provide a ring laser inertial angle encoder capable of functioning as a highly precise laboratory standard for accuracy testing and calibrating other angle encoders.

These and other objects are met by a ring laser inertial angle encoder comprising a rotatable gas-filled ring laser which, upon rotation, generates an output signal having an instantaneous frequency proportional to the instantaneous rotation rate of the laser, the output signal being encoded into digital pulses or counts; and angular velocity stabilization feedback loop which operates to maintain the laser rotation at a constant rate and above a predetermined threshold value, thereby insuring that the angle through which the laser rotates between successive digital counts of the laser's output signal is constant; a scanner-photometer rigidly affixed to the laser and rotatable therewith about the laser's rotation axis, which scans the plane of rotation continuously through successive cycles of 360° and which converts the light intensity of each target scanned into an electrical signal having a frequency proportional thereto; and an estimator-detector circuit coupled to the outputs from the ring laser and the photometer, which estimates the optical center of each target scanned, records the laser's digital count (and fraction thereof) existing when each target center is scanned and, by operating on these digital counts, generates a digital output representing the angular difference in inertial positions of the two targets of interest.

For example, where it is desired to measure the angular difference between targets $T_1$ and $T_2$, the laser's digital count, corresponding to the estimator-detector circuit's best determination of the optical center of target $T_1$, is stored; the laser's digital count corresponding to the best estimate of the center of target $T_2$ is stored; and the laser's digital count corresponding to a second estimation of the center of target $T_1$ is also stored. The second estimation on target $T_1$ occurs when the system completes a full rotation cycle of 360° from the scan position at the first estimation of the target center of $T_1$, and is necessary in order to provide self-calibration within the system. The resulting digital counts for the aforementioned three target center estimations are combined to provide the aforementioned output.

Further objects, features and advantages of the present invention and a better understanding thereof will become apparent from the following detailed description taken in conjunction with the accompanying drawings, of which:

PREFERRED EMBODIMENT

Figure 1:
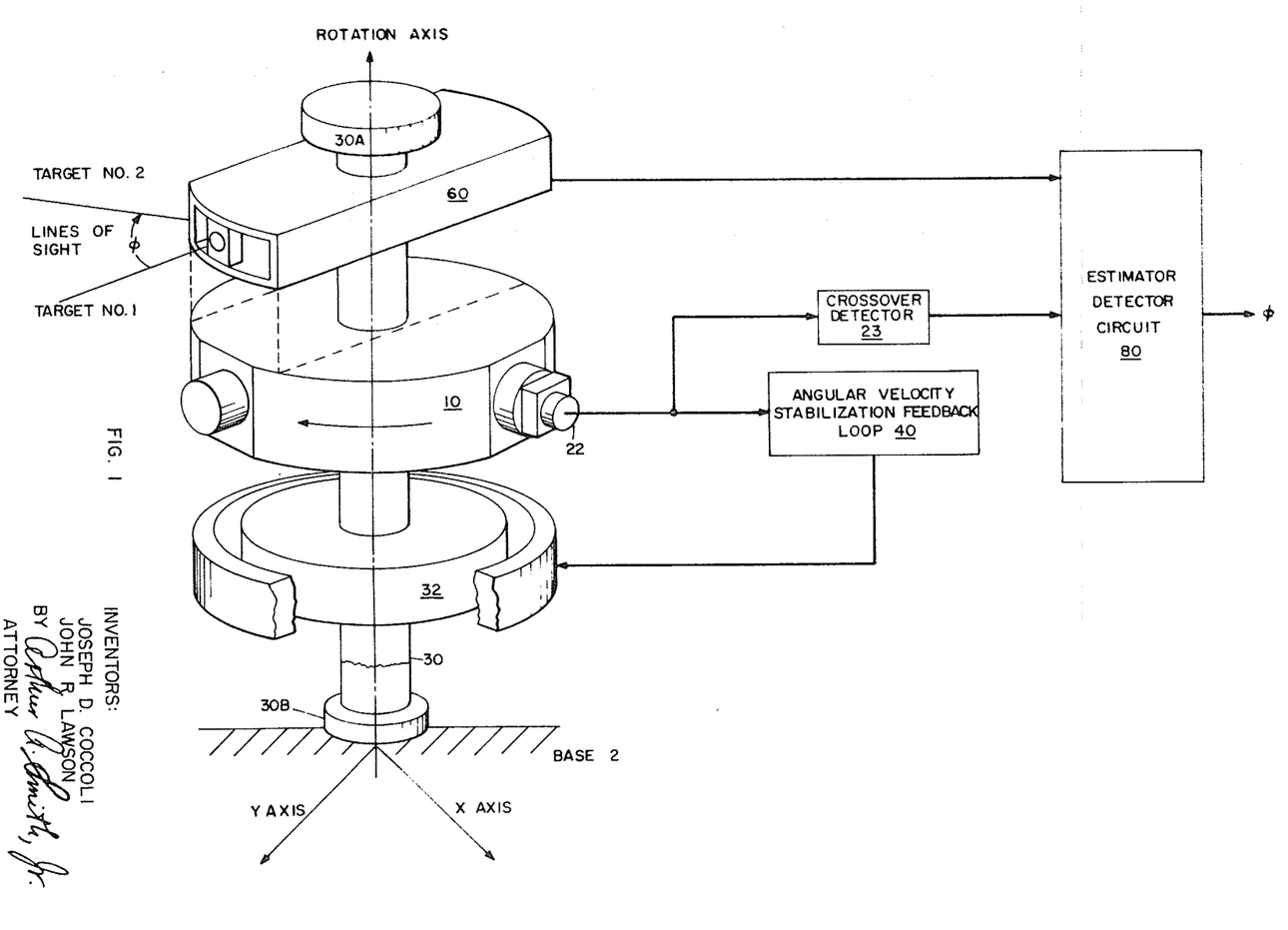
FIG. 1 is a functional block diagram of the invention showing the interrelationship of the various components thereof.

As noted in the functional block diagram of FIG. 1, the inertial encoder basically comprises rotatable gas ring laser 10 pysically coupled to base 2 via shaft 30 having end bearings 30A and 30B and about which is mounted torquer 32, such that laser 10 is free to rotate about its sensitive axis (rotation axis) relative to base 2 which is an inertially stabilized platform with respect to any two axes (say $x$ and $y$) orthogonal to the rotation axis and to each other; angular velocity stabilization feedback loop 40 coupled to laser 10 and torquer 32; scanner-photometer 60 rigidly affixed to laser 10 and rotatable therewith about the laser's rotation axis; and estimator-detector circuit 80 coupled to laser 10 (via crossover detector 23) and to scanner-photometer 60, which generates a digital signal $\phi$ representing the angular difference in inertial positions between the two targets of interest.

Prior to describing the system in detail, it is noted that since the encoder operates on received light intensities from targets, the target must emit light naturally, as stars; or a light source must be provided, such as a beacon on a surveying marker; or the target must be a plane reflector, reflecting light generated by an autocollimator source within the scanner-photometer.

Further, two preferred configurations of estimator-detector circuit 80 are disclosed, one configuration for use where the targets are emitting or reflecting low intensity light, e.g., less than $10^8$ photons per second; and the other configuration for use where the targets are emitting or reflecting high intensity light, e.g., autocollimation from mirrors relatively near to the scanner-photometer. In the first mentioned configuration the input to estimator-detector 80 from scanner-photometer 60 is digital; in the second mentioned configuration, it is anolog. It is understood that both of the aforementioned configurations may be incorporated into the same device by adding an intensity level detector to direct each incoming signal from scanner-photometer 60 into that configuration appropriate to the light intensity represented by each signal.

As will also be explained, some a priori knowledge of the light intensity of each target of interest must be known to allow a threshold to be pre-programmed in estimator-detector circuit 80. This is obtainable from star tables in the case of stellar measurements, from the beacon placed on each target for surveying, and so forth. A detailed description of each system component and the interrelationship of one to the other will now be made.

Ring laser and stabilization loop

Although they are relatively new instruments, the structure and many operational features of gas ring lasers are desicribed in the literature. For example, many of the salient features of this type of instrument, when used as a gyroscope, are described by Philip J. Klass in an article entitled, "Laser Unit Challenges Conventional Gyros," which appears in Aviation Week and Space Technology, McGraw-Hill, vol. 85, No. 11, Sept. 12, 1966. A similar description is given in an article entitled "News in Focus," which appears in Laser Focus, vol. 2, No. 19, October 1966. A detailed description of gas ring lasers can also be found in co-pending application Ser. No. 626,198, by Joseph D. Coccoli and Dusan A. Koso, now Pat. No. 3,469,922; and in co-pending application Ser. No. 734,407, by Joseph D. Coccoli and John R. Lawson.

Figure 2:
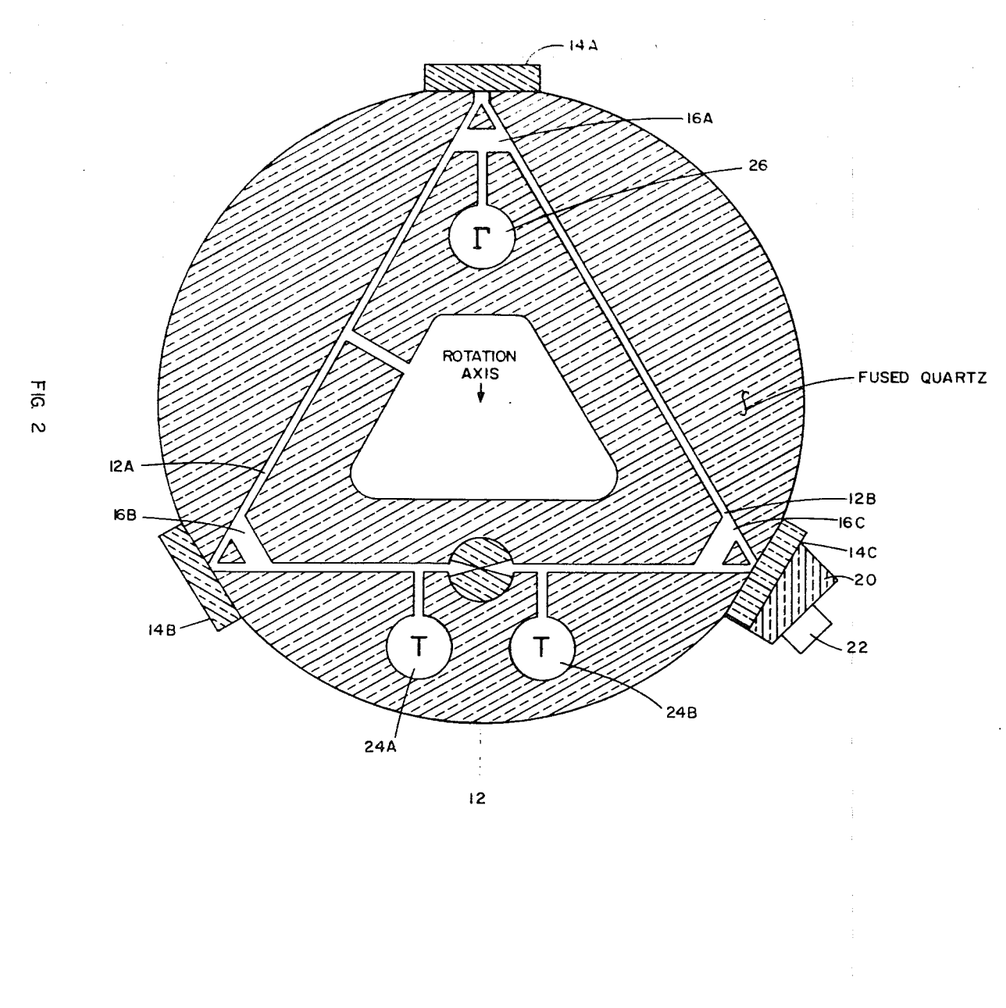
FIG. 2 is a sectional view of a typical solid quartz cavity gas ring laser used as a component of the invention.

A typically configured ring laser used with the invention is shown in FIG. 2. As noted therein, laser 10 is machined from a circular block of transparent solid fused quartz. Internal to the block is resonant cavity or channel 12 forming an equilateral triangle and comprising symmetrically disposed discharge arms 12A and 12B which by design form a closed optical path. Dielectric film mirrors 14A through 14C respectively are mounted at each corner of channel 12. (It is noted that, for purposes of the invention, the laser channel and block may have a rectangular configuration such as that described in the aforementioned copending applications. In fact, any workable design is satisfactory.)

The length of channel 12 is designed such as to support only a single longitudinal optical mode of a twin neon isotope helium-neon ring laser at low excitation. For the laser used in the preferred embodiment, channel 12 is 25 to 30 centimeters long and has a diameter of one to two-millimeters. Channel 12 is filled with a helium-neon mixture in the approximate ratio 5:1 at a total pressure of approximately three torr. The mixture comprises isotope helium-3 and optimum amounts of isotopes neon-20 and neon-22. The neon isotopes are the lasing or active isotopes, and the optimum concentration ratio of neon-20 to neon-22 is approximately 27/33. Bypasses 16A through 16C for gas discharge current are provided adjacent to each mirror, and large ballast reservoirs (not shown) are provided to minimize pressure changes due to discharge clean up processes and outgassing.

At one corner of channel 12 is located piezoelectric transducer 18; combining optics 20 and photocell detector 22. An aperture or mating surface is machined in the center of laser 10 for mounting on shaft 30.

The laser gaseous medium is excited by the application of D-C voltages between the anodes 24A and 24B and the cathode 26, producing a laser gas that, in conjunction with the resonant optical channel, generates and supports two contra-traveling light waves within channel 12. A small portion of the light from each of the two contratraveling light waves incident on mirror 14C (adjacent to combining optics 20) is allowed to pass through the mirror to the combining optics. The two waves are combined so as to be nearly parallel. A wave front interference is thus produced, which manifests as an optical intensity pattern of light and dark regions that move past detector 22. The detector dimensions are much less than the dimensions of each light and dark region. The repetition rate of the optical intensity pattern passing detector 22 is called the laser beat frequency, and the number of pairs of light and dark regions that pass detector 22 in an interval of time is the digital count output associated with that time interval.

When the laser is not rotating, the optical path lengths (in the clockwise and counterclockwise directions) viewed by an observer in an inertial reference frame are equal, and the contratraveling waves have a common frequency. (The interference pattern then appears stationary with respect to opitcal detector 22.) With rotation, however, the path lengths in inertial space traveled by the two waves to return to the same point in the ring laser differ by an amount proportional to the inertial rotation rate, and consequently the resonant optical frequencies of the contratraveling waves associated with a particular longitudinal mode of the ring laser cavity appear to be oppositely frequency shifted by an amount proportional to the inertial rotation rate when viewed by an observer in the rotating frame of reference fixed to the ring laser cavity. (The term "inertial rotation rate," as used throughout the specification and claims, is commonly understood in the art as the rotation rate relative to a non-rotating, non-accelerating frame in inertial space.) As aforementioned, the difference between the frequencies of the two waves is the beat frequency which is measured by detecting a time-varying amplitude generated when the two waves combine on external optical detector 22, appearing as the aforementioned interference pattern moving past the detector.

The frequency of the A-C signal from optical detector 22 is a monotonic function of the rotation rate of the instrument. In the preferred embodiment each time that the amplitude of the output of the A-C signal goes through the zero crossover point with positive slope, a digit is counted by crossover detection logic 23 coupled to the laser's optical detector 22. Detection logic 23 is a standard analog-to-digital converter which produces a digital pulse whenever the appropriate crossover point appears.

Ideally, the angle through which the laser has rotated in inertial space between successive digits is constant for a given ring laser. This is defined as the laser's scale factor. Consequently, the digital count is ideally indicative of the angle of rotation, and hence a full cycle of 360° can be accurately calibrated into angular increments by utilizing this phenomenon.

Figure 3:
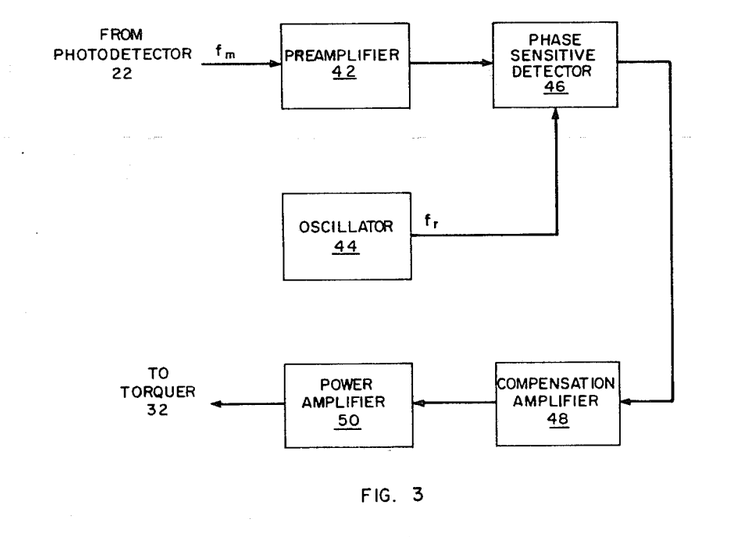
FIG. 3 is a functional block diagram of the velocity stabilization feedback loop.

In practice, however, it has been determined that the relationship between rotation rate and beat frequency is generally non-linear due to electromagnetic interactions within the instrument itself, and the scale factor becomes a function of rotation rate. Hence, to achieve a scale factor that is constant over an interval of time, a constant rotation rate is necessary over that interval of time. For purposes of the invention, the primary source of electromagnetic interaction leading to the aforementioned non-linearity is attributed to the phenomenon known as "mode coupling." Briefly, various optical scattering sources within the rotating laser, principally the mirrors and Brewster plates (if any), cause some of the light from each traveling wave to be scattered back in the path of the other wave which is traveling in the opposite direction. The scattered radiation is frequency shifted from the frequencies of the contratraveling waves by an amount proportional to the ring laser rotation rate. The scattered frequency shifted waves, in turn, may induce large amplitude contratraveling optical waves at the back scattering frequencies, which, in turn, lead to frequency pulling of the original or primary waves. The ultimate result is that, at low rates of rotation, the non-linear dependence of beat frequency on rotation rate becomes very pronounced; and when the rotation rate falls below a critical threshold value, usually on the order of ten to one hundred earth rate units, there exists no beat frequency. This problem is overcome by maintaining ring laser rotation at a constant rate sufficiently high to prevent operation in the area of the aforementioned pronounced non-linearities above the threshold or lock-in region, to wit, through angular velocity stabilization loop 40 shown in FIG. 3.

In the preferred embodiment the loop is an electro-optical bias rotation feedback loop essentially identical to that described in the aforementioned co-pending application Serial No. 626,198. As noted in FIG. 3, the stabilization loop comprises pre-amplifier 42 which continuously receives and amplifies the beat frequency output signal $f_m$ from optical detector 22 of the ring laser; oscillator 44 which is adjusted at a reference beat frequency signal $f_r$, where $f_r$ corresponds to a predetermined laser rotation rate $W_0$ chosen sufficiently high to avoid operation within the area of pronounced non-linearities which exist above the critical threshold region; phase-sensitive detector 46 which compares beat frequency signals $f_m$ and $f_r$ and generates a difference signal; compensation amplifier 48 which amplifies the difference signal so as to provide the loop gain factor and frequency compensation required by system design; and power amplifier 50 coupled to torquer 32 on the laser's rotatable shaft which, responsive to this difference signal, energizes the torquer, causing shaft 30 and hence laser 10 to rotate at the desired constant rate. $W_0$ is usually chosen as ten to one hundred times the rate of lock-in, depending on the specific accuracy desired and the characteristics of the particular laser used.

The resulting A-C signal output from ring laser 10 is such that upon processing as aforementioned by crossover detector 23, a digital count is generated directly proportional to the angle through which the laser has rotated.

A more detailed discussion of the phenomenon of mode coupling outlined above can be found in the aforementioned co-pending applications and in two M.I.T. Instrumentation Laboratory reports, Report E–1943 entitled, "A Scheme for Precision Angular Stabilization Using Ring Lasers," by Joseph D. Coccoli and Dusan A. Koso, August 1966; and Report E–2237 entitled, "Ring Laser Rotation Sensing Systems and Analysis," by Joseph D. Coccoli, yet to be published.

It should be noted in passing that drifts in beat frequency at constant rotation rate may also occur over extended periods of time due to a number of environmental factors not directly related to rotation rate. These error sources arise from temporal variations in such laser properties as the single pass gain and mode number of the laser gas, the de-tuning of the laser's optical frequency, and the relationship between the D-C discharge currents within the laser's cavity. According to the present invention, such error sources are of no major consequence due to the relatively rapid self-calibrating feature of the invention, to be described later, wherein calibration occurs every 360° of rotation in a time which is short compared to the predominant periods of the temporal variations in the environmental factors.

Other error contributing sources, such as mechanical and thermal distortion, axis wobble, dust, atmospheric density and the like, are effectively eliminated by good design techniques known in the art and embodied in the ring laser of FIG. 2.

Scanner-photometer

Figure 4A:
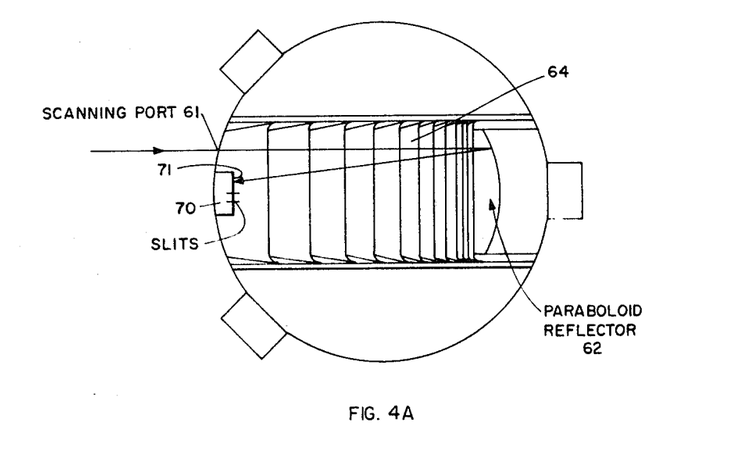
FIG. 4A is a sectional view of the scanner-photometer used with the invention.

As depicted in FIG. 4, scanner-photometer 60, mounted on laser 10, basically comprises quartz cube-shaped container 70 having inscribed on rear surface 71 thereof two rectangular slits positioned at the focal plane; paraboloid reflector 62 at the other end of the photometer directly opposite the aforementioned slits in container 70; and a series of baffles 64 against indirect and scattered stray light. The reflector serves as the focusing optics. The entire photometer unit, in the preferred embodiment, is comprised of solid fused quartz and is directly bonded to the ring laser's block to provide maximum rigidity.

Figure 4B:
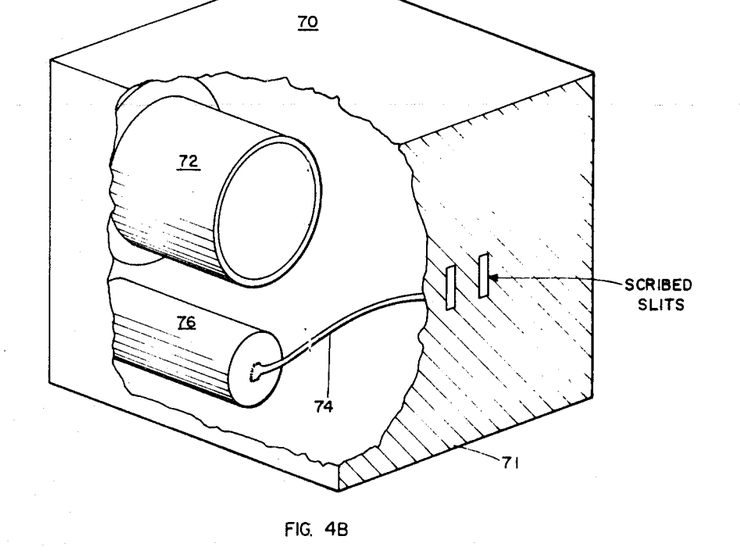
FIG. 4B is a cutaway view showing the photometer detector and autocollimating optical source within the scanner-photometer of FIG. 4A.

A cutaway view of container 70 is shown in FIG. 4B.

As noted therein, container 70 contains photodetector 72 positioned behind the aforementioned slits and a light source introduced through optical fiber 74 terminating behind a slit and coupled to pen light 76 to be used in applications requiring autocollimation.

The slits on container 70 are formed by depositing an aluminum coating on the rear surface to coincide with the focal point of paraboloid reflector 62. As aforementioned, in the preferred embodiment, two slits spaced three microns apart are used; and each slit is approximately 20 microns high and one micron wide. Any number of slits may be used depending on the application, according to the principle that generally the accuracy can be increased as the square root of the number of slits.

Container 70 may be replaced with a quartz plate configured similar to surface 71 having inscribed thereon the required number of slits and positioned coincident with the focal point of paraboloid reflector 62. The remaining components would be positioned as aforementioned.

The input to the photometer is a plane wave of light. (It should be restated that the light intensity of each target of interest must be known a priori within some limits based on the intended application. Hence, in surveying, for instance, each target must have located thereon a beacon or other light source.) The light enters scanning port 61 of photometer 60, is reflected by paraboloid reflector 62 and formed into a spot of light which is focused on rear surface 71 of container 70, i.e., the image plane. As photometer 60 begins to scan the target, the spot sweeps across surface 71 and enters the first slit. The light allowed through the slit is incident on photodetector 72 which generates an electrical output proportional to the intensity of the light received. In the embodiment utilized with low intensity targets, the output of photodetector 72 is a series of random current pulses, the average frequency of occurrence of such pulses in a discrete time interval being directly proportional to the received light intensity. In the embodiment for high intensity targets, the output from photodector 72 is a continuous current having a frequency directly proportional to the received light intensity. The output from photodetector 72 is fed to estimator-detector 80, the operation of which shall now be described in conjunction with the other components in the system.

ESTIMATOR-DETECTOR

Figure 5:
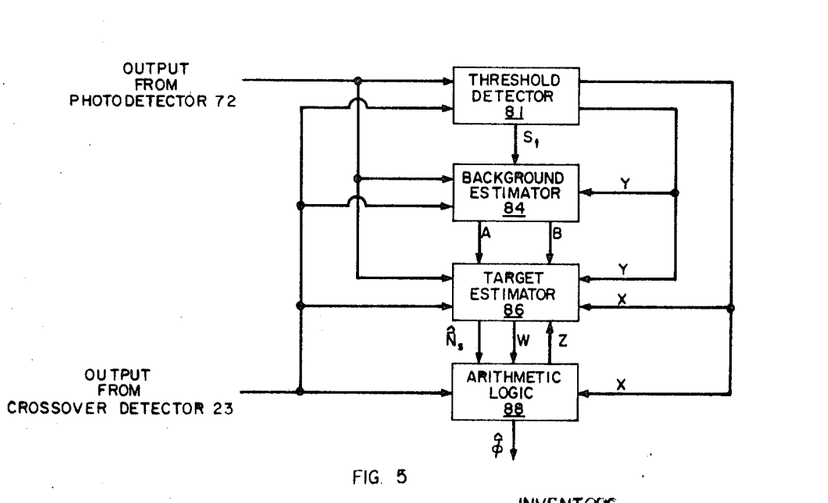
FIG. 5 is a functional block diagram of the estimator-detector circuit showing its interrelationship with the other components of the invention.

Referring now to FIG. 5, Estimator-Detector 80 comprises Threshold Detector 81, Background Estimator 84, Target Estimator 86 and Arithmetic Logic 88, coupled as shown to the signal output from photodetector 72 of scanner-photometer 60 and to the digital count output from crossover detector 23 of ring laser 10. The circuit configurations of these components differ depending on whether the target images to be measured are of high or low intensity light. (The target image is a diffraction limited spot of light of a few microns in extent which is swept across the scribed slits on surface 71 of container 70 as scanner-photometer 60 rotates.) However, the following functional description applies to either configuration.

As scanner-photometer 60 scans the plane of rotation through each cycle of 360°, light is continually entering scanning port 61 even in the absence of a target due to the existence of light from the background (i.e., from sources other than the targets of interest). This background light is processed as aforementioned, causing photodetector 72 to generate an output signal which is received by Threshold Detector 81, Background Estimator 84 and Target Estimator 86. As described in detail later in these specifications, the level of background light existing just prior to target detection is estimated by Background Estimator 84.

As the first target of interest enters the field of view of scanner-photometer 60 and the target image spot sweeps across the first scribed slit of container 70, the output from photodetector 72 increases in a manner dependent on the nature of the output (i.e., analog or digital) as aforementioned. The signal from photodetector 72 is sensed by Threshold Detector 81 which, after a predetermined time delay, activates Target Estimator 86. The time delay is chosen such that Target Estimator 86 is activated when the target image spot is approximately halfway between the first and second slits. As such, the particular value chosen is a direct function of scan rate. Target Estimator 86 processes the output from photodetector 72 as the target image spot sweeps across the second scribed slit. The timing requires precise control since premature activation will result in the photodetector's signal being processed while the target image spot is still sweeping the first scribed slit, while a tardy activation will initiate processing after the target image spot has already entered the second scribed slit. Target Estimator 86 estimates the laser's digital count (from crossover detector 23) that occurred when the optical center (or "center of gravity") of the target was scanned, i.e., when the optical center of the image spot coincided with the center of the second scribed slit. As described later, the accuracy of this estimate is improved by including in the calculation procedure of the Target Estimator 86 the background light estimate received from Background Estimator 84. The above process is repeated for each of the targets scanned. The result is an estimate of the digital counts which occured upon detection of the optical center of the first target scanned, the second target scanned, and the first target scanned again after a rotation cycle of 360° from the initial scan of the first target, the above events being in the sequence described.

Operating on this data from Target Estimator 86, Arithmetic Logic 88 calculates the inertial angle between the two targets of interest.

Figure 6:
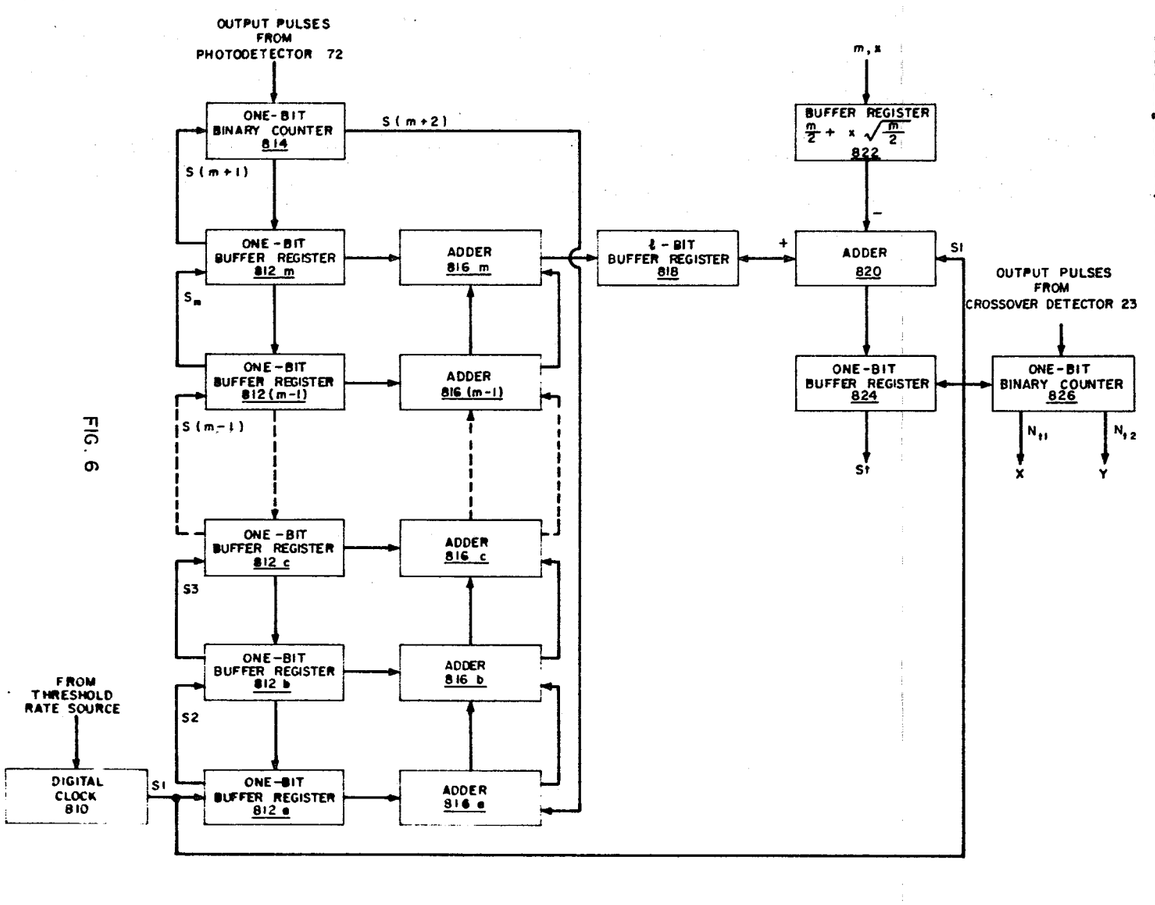
FIG. 6 is a block diagram of the Threshold Detector of the circuit of FIG. 5, as configured for low optical intensity targets.

The particular embodiments of Estimator-Detector 80 for the digital and analog applications are described below in detail. It is noted that the techniques and components described below offer only the preferred implementation of the Estimator-Detector, and variations therein are possible and still remain within the scope of the invention. All of the components depicted in FIGS. 6 through 7A are standard in the art and available from a variety of manufacturers.

Embodiment for low optical intensity targets

Where the targets are generating or reflecting light of low optical intensity, the output from photodetector 72 is a series of random current pulses. Threshold Detector 81, implemented as shown in FIG. 6, continually compares the output count of these pulses within a discrete time interval with the estimated average count of pulse occurrence for worst case background noise conditions within an equal interval. An increase in the actual pulse count above this estimated background count provides an indication of target presence.

If the background rate is fairly constant for all directions in scanning 360°, the threshold detector senses target image presence against background where the signal-to-noise ratio is as small as unity. If the background rate varies considerably with scan angle, the threshold detector can only be set to sense target image presence when the signal-to-noise with worst background condition is greater than unity.

Referring now to FIG. 6, one-bit buffer registers 812a through 812m, where m represents any number of repetitive units from one to infinity, are coupled in conjunction with one-bit counter 814 to implement a standard shift register. The output pulses from photodetector 72 are fed to counter 814 and shifted down one buffer register at a time through the chain of registers on each successive command of clock 810.

The rate of clock 810 is set at the average worst case background rate. (This is effected manually after the background average rates have been determined as a function of scan angle, but it can also be done automatically with additional circuitry.) Briefly, signal S1 from clock 810 clears register 812a. Simultaneously, signal S2 is generated which shifts the contents (0 or 1) of register 812b into register 812a. Likewise, signal S3 is generated, shifting the contents of register 812c into register 812b. This process continues through the chain of registers until signal $S(m+1)$ shifts the contents of counter 814 into register 812m and generates signal $S(m+2)$.

Signal $S(m+2)$ enables adder 816a, thereby initiating the sequential summation, via adders 816a through 816m of the contents of all the registers 812a through 812m. Because the background pulse generation process is statistical in nature when the background rate is independent of scan angle, there is an equal probability that in each interval of time between digital beats of clock 810 a background pulse may or may not appear from photodetector 72 at counter 814. Thus, the most probable sum of the contents of all of the registers is $m/2$ with a one $\sigma$ variance of $\sqrt{m/2}$. The sum of the contents of registers 812a through 812m is stored in $l$-lit buffer register 818, where $l > \log_2 m$.

Signal S1 from clock 810 also couples to adder 820, causing it to subtract $(m/2 + x\sigma)$ stored in register 822 from the contents stored in register 818 (due to the aforementioned summation). The acceptable degree of probability of target detection is predetermined. Then, $$m/2 + x\sigma$$

may be chosen by reference to standard tables of the Poisson Probability Cumulative Terms, where $x$ is the number of variance counts above the average count (e.g., $m/2$) that must be present in buffer 818 to obtain the desired probability. The value $x$ is chosen greater than unit. The choice of $m$ and $x$ are dictated by the background rate and signal-to-noise ratio expected in a particular application. A threshold activation signal occurs if the output of adder 820 is positive and greater than zero (i.e., a binary one). A positive output from adder 820 is stored in one-bit buffer register 824 which, responsive thereto, enables counter 826 and transmits a pulse, signal $S_t$, to Background Estimator 84.

Counter 826 counts the digital output pulses of crossover detector 23, and, when the count reaches the number $N_{t1}$, signal X is transmitted to Target Estimator 86. (At the count $N_{t1}$, the target image spot is approximately halfway between slits 1 and 2 on photometer detector container 70.) Counter 826 continues to count until the number $N_{t2}$, at which time signal Y is transmitted to Target Estimator 86. ($N_{t2}$ is the number of digital counts that must occur from detection of the target image in the first slit until the target image has passed the second slit by a distance equal to half the spacing between the first and second slits.) As explained later in the specification, signal Y indicates to Target Estimator 86 that data collection is completed and initiates processing of the data stored within the Target Estimator.

Figure 6A:
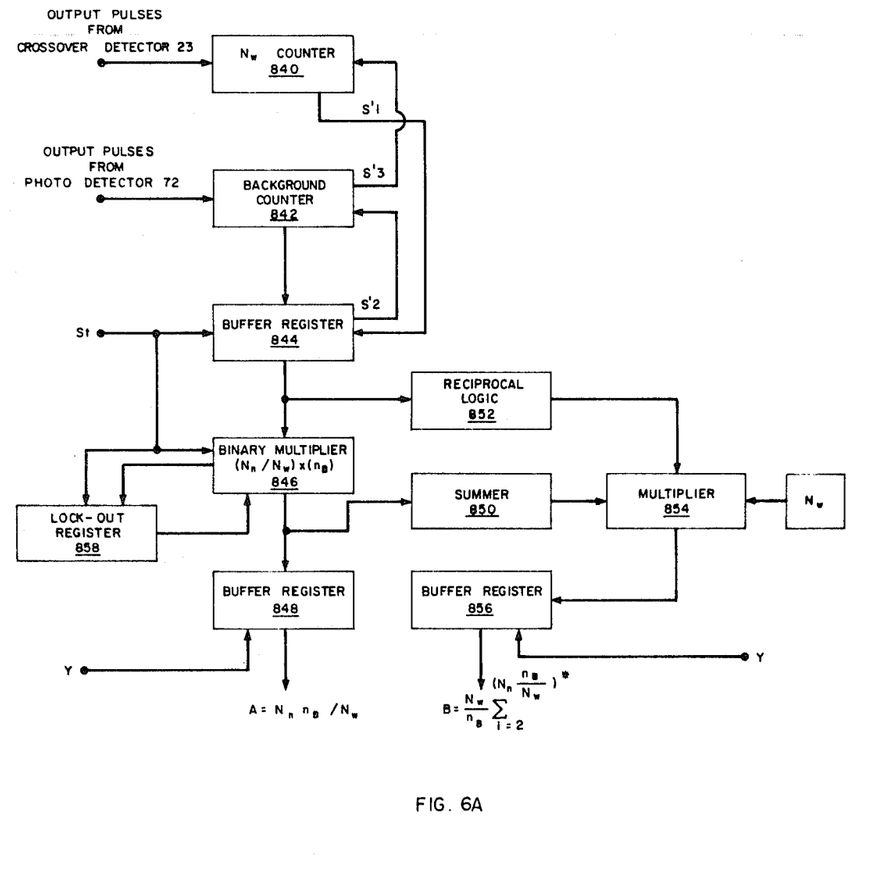
FIG. 6A is a block diagram of the Background Estimator of the circuit of FIG. 5, as configured for low optical intensity targets.
Figure 7:
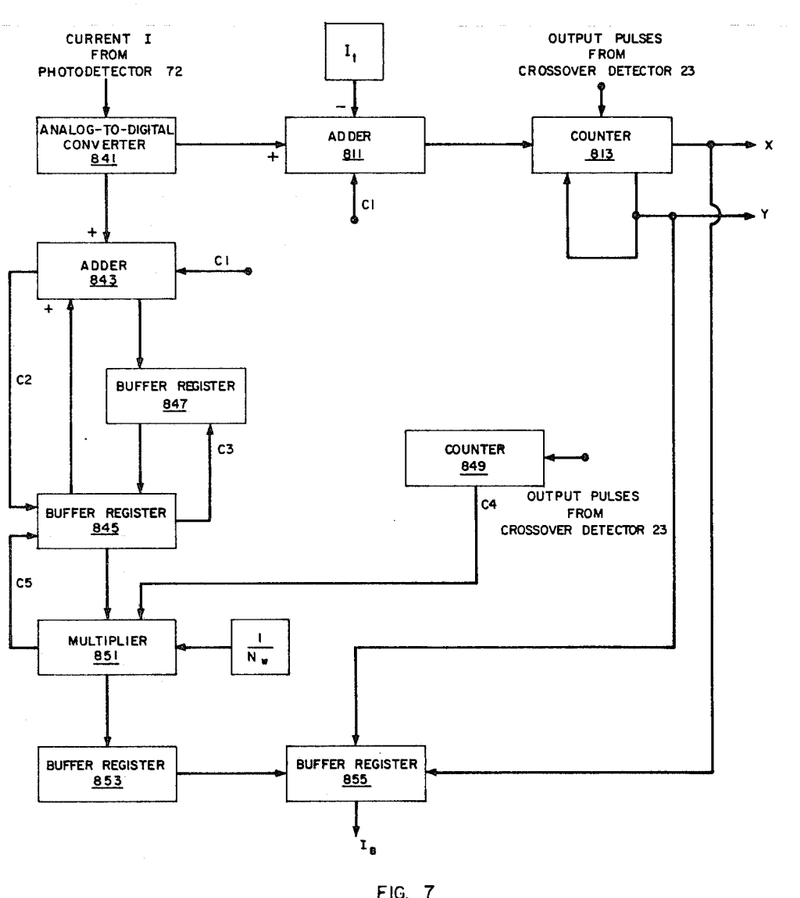
FIG. 7 is a block diagram of the combination Threshold Detector and Background Estimator of the circuit of FIG. 5, as configured for high optical intensity targets.
Figure 7A:
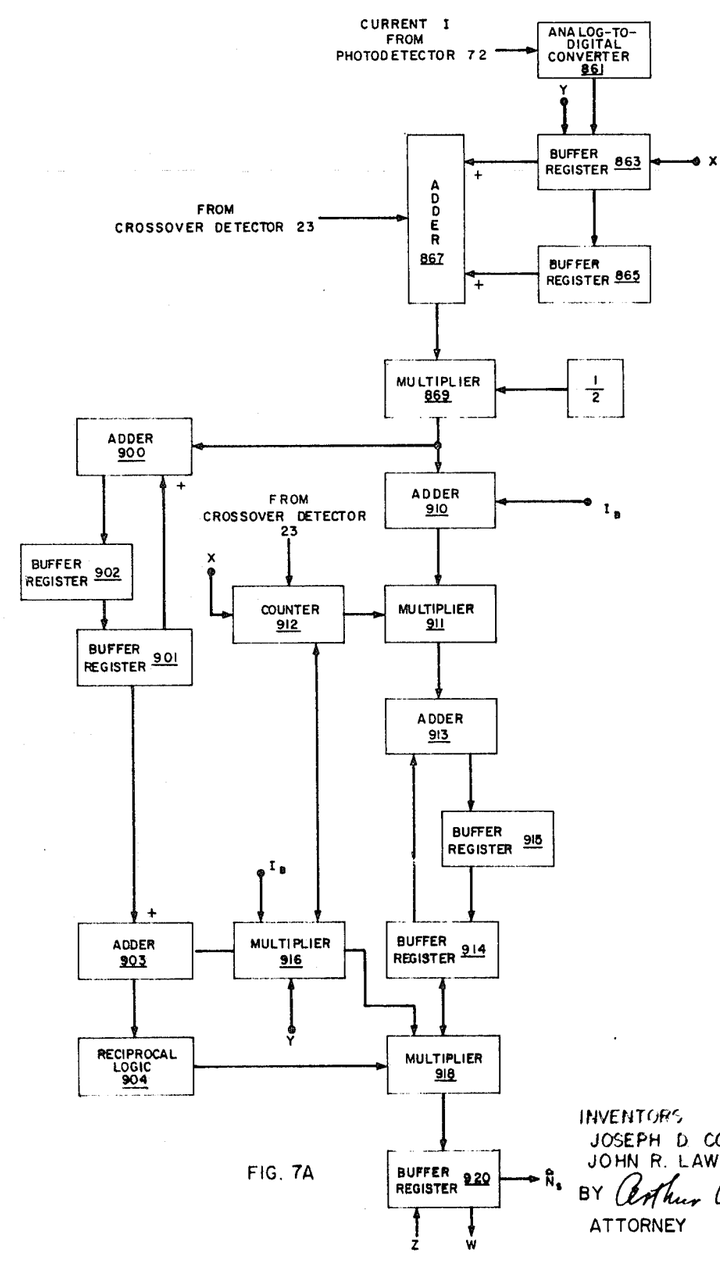
FIG. 7A is a block diagram of the Target Estimator of the circuit of FIG. 5, as configured for high optical intensity targets.

Background Estimator 84, implemented in FIG. 6A, determines the average number of background pulses generated by photodetector 72 per ring laser digital count. Since it is not possible to determine the background contribution to the photodetector output when a target image is incident on the photodetector, Background Estimator 84 determines the background pulse rate per ring laser digital count just prior to a target sweeping the first slit on container 70 of the scanner-photometer.

Referring now to FIG. 6A, the digital count output from crossover detector 23 is coupled to counter 840, while the digital output pulses from photodetector 72 are coupled to counter 842. Counter 840 counts the ring laser output pulses generated in crossover detector 23 until it has accumulated a total of $N_w$ counts at which time it generates output signal S'1. The value of $N_w$ is chosen to obtain a statistically significant sampling of the background noise. In the preferred embodiment $N_w$ is the number of counts that occur during the time the image spot moves a distance of one hundred slit widths. Signal S'1 from counter 840 clears buffer register 844 which, in turn, generates signal S'2 transferring the contents of counter 842 into register 844, clearing counter 842 and generating signal S'3. Signal S'3, in turn, clears counter 840 thereby terminating signals S'1 and S'3. Counter 840 again begins to count from zero through its cycle to $N_w$ counts at which time the aforementioned process is repeated. These normal counting cycles are repeated continuously until interrupted by signal $S_t$ from register 824 of Threshold Detector 81.

During the normal counting cycle as counter 840 counts ring laser digital counts from zero to $N_w$, counter 842 counts the pulses (background events) from photodetector 72 from zero to the final value, say $n_B$. During this count there remains stored in register 844 the total number of background pulses counted by counter 842 in the cycle preceding the present normal counting cycle. Thus, when a target image begins sweeping across the first slit of container 70 and causes signal $S_t$ to be generated by Threshold Detector 81, valid background data stored in register 844 is available for processing.

Signal $S_t$ from register 824 of Threshold Detector 81 activates binary multiplier 846 which multiplies the number $n_B$ in register 844 by $N_n/N_w$. ($N_n$ is defined later.) The product of this multiplication, $N_n n_B/N_w$, is stored in register 848 and, also, in summer 850. Simultaneously, the output from register 844 is fed to logic block 852 where the reciprocal $1 n_B$ is taken. The outputs from summer 850 and logic 852 are multiplied in multiplier 854 by $N_w$, and the product:

$$\left(\frac{N_w}{n_B}\right) \sum_{i=1}^{\left(N_n \frac{n_B}{N_w}\right)^*} i \qquad \text{Eq. 1}$$

is stored in register 856, where $$\left(N_n \frac{n_B}{N_w}\right)^*$$

is the nearest integer $$\leq N_n \frac{n_B}{N_w}$$

Completion of the multiplication by multiplier 846 and the presence of signal $S_t$ activate lock-out register 858 which prevents additional multiplications until $S_t$ first goes to zero and then reappears with threshold detection of a new target image.

The contents of register 848 and 856 are read out upon application of the Y signal from counter 826 of Threshold Detector 81.

Figure 6B:
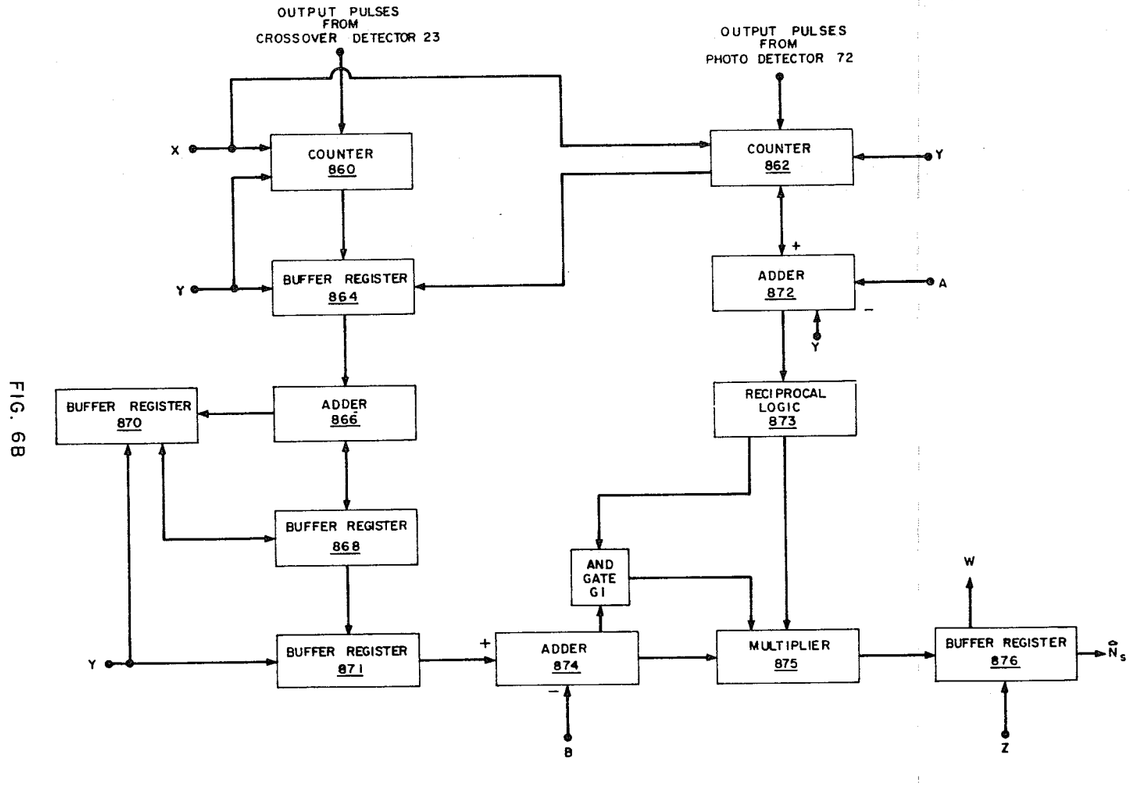
FIG. 6B is a block diagram of the Target Estimator of the circuit of FIG. 5, as configured for low optical intensity targets.

Target Estimator 86, as implemented in FIG. 6B, processes the output of photodetector 72 during the transit of the target image spot across the second slit on container 70. The output of the target estimator is a number which is the estimate of the number of ring laser digital counts from the time the target estimator is activated until the target image is centered in the second slit. Stated mathematically, $$\widehat{N}_s = \frac{\sum_{i=1}^{n_s} N_{si}}{n_s} \qquad \text{Eq. 2}$$

In Eq. 2 $N_{si}$ is the number of ring laser digital counts that have occurred from the time the target estimator is activated by Threshold Detector 81 until the $i^{th}$ target pulse (from the photodetector 72) is received by the target estimator. The total number of target pulses from photodetector 72 in the time between activation and de-activation of Target Estimator 86 is $n_s$. The total number of counts during the total activation time of the Target Estimator due to both the background and target is $n$. The average rate of background counts per ring laser count is the number $n_B/N_w$. The estimator is activated for a set number $N_n = N_{t2} - N_{t1}$ of ring laser digital counts. Therefore, $$n_s = n - N_n \frac{n_B}{N_w} \qquad \text{Eq. 3}$$

The values of the ring laser count at which noise pulses are expected on the average are $$N_{Bi} = i \frac{N_n}{N_n \frac{n_B}{N_w}} = i \frac{N_w}{n_B} \qquad \text{Eq. 4}$$

where $i = 0, 1, 2 \ldots$

Thus, $$\widehat{N}_s = \frac{\left(\sum_{i=1}^{n} N_i\right) - \left(\frac{N_n \frac{n_B}{N_w}}{n_B} \sum_{i=1}^{n} i\right)}{n - N_n \frac{n_B}{N_w}} = \frac{\left(\sum_{i=1}^{n} N_i\right) - B}{n - A} \qquad \text{Eq. 5}$$

where A and B are the outputs from registers 848 and 856, respectively, of Background Estimator 84 of FIG. 6A, and where $N_i$ is the number of ring laser digital counts that have occurred from the time the target estimator is activated by Threshold Detector 81 until the $i^{th}$ pulse (from the photodetector 72) is received by the Target Estimator.

Referring now to FIG. 6B, counters 860 and 862 are activated by a signal from the X output of Threshold Detector Counter 826. Each time a pulse is counted in counter 862, a signal is transmitted therefrom to register 864 commanding that register to sample and store the count which then exists in counter 860. (Counter 860 is not cleared, however.) Completion of storage in register 864 generates a command to adder 866 to read out and sum the binary numbers stored in registers 864 and 868, transfer this sum to reigster 870 and clear register 868. Clearing register 868 causes transmission of a signal to register 870, shifting the contents of register 870 into register 868. The above sequence of events is repeated each time a new pulse from photodetector 72 is counted in counter 862 or until receipt of a Y signal from counter 826 of Threshold Detector 81.

Signal Y from Threshold Detector 81 disables counters 860 and 862, shifts the count in counter 862 into adder 872 and clears the contents of counter 860 and of buffer registers 864 and 870. Further, the count in register 868 is shifted into register 871.

As aforementioned, signal Y has also read out the contents of register 878 in Background Estimator 84, generating a signal at the A output. The negative of this A signal is applied to adder 872 of Target Estimator 86 where it is added to the count from counter 862, and the output is fed to logic 873 where the reciprocal thereof is taken.

Referring now to the previous discussion of FIG. 6A, signal Y also acted for read out the contents or register 856 of Background Estimator 84, generating a signal at the B output. The negative of this B output is applied to adder 874 where it is added to the contents of register 871.

The existence of outputs from both adder 874 and reciprocal logic 873 enables AND gate G1, which, in turn, transmits a pulse to multiplier 875 which multiplies the contents of adder 874 and logic 872.

The product $\widehat{N}_s$ is stored in buffer register 876 for eventual transmittal to Arithmetic Logic 88, as is explained later in the specification. Simultaneously, with the storage of product $\widehat{N}_s$ in register 876, signal W is transmitted to Arithmetic Logic 88.

Figure 6C:
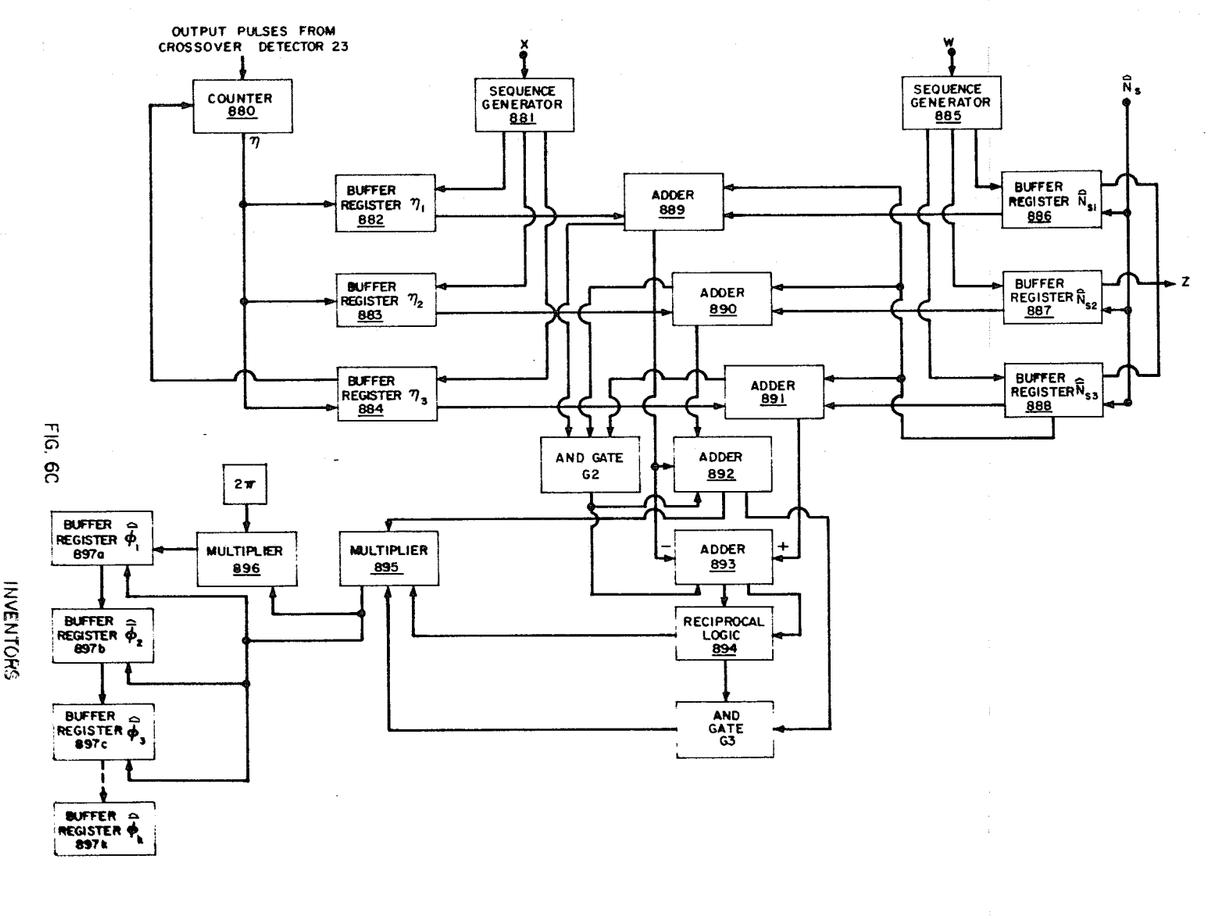
FIG. 6C is a block diagram of the arithmetic logic employed in the circuit of FIG. 5.

Arithmetic Logic 88, illustrated in FIG. 6C, computes the angle between two targets from the information supplied by Target Estimator 86. The arithmetic logic calculates the following:

$$\widehat{\phi} = \frac{N_2 - N_1}{N_3 - N_1} 2\pi \equiv \frac{(\eta_2 + \widehat{N}_{s2}) - (\eta_1 + \widehat{N}_{s1})}{(\eta_3 + \widehat{N}_{s3}) - (\eta_1 + \widehat{N}_{s1})} 2\pi$$

Eq. 6 where, by virtue of the constancy of scale factor relating ring laser digital counts to angle, the number $\widehat{\phi}$ is the estimated inertial angle between targets T1 and T2 subtended at the angle encoder. A continuous count $\eta$ of the ring laser digital output is kept in counter 880. When Threshold Detector 81 signals detection of a target, the existing value of $\eta$ is stored in a buffer register. Thus, $\eta_1$ is the counter number at detection of the first target, $\eta_2$ is the counter number at detection of the second target, and $\eta_3$ is the counter number at detection of the first target a second time after a full 360° rotation of the scanner.

$\widehat{N}_s$ is the estimated additional number of counts between the time the target threshold is detected and the estimated coincidence of the "center of gravity" of the target image with the center of the second slit on container 70 of scanner-photometer 60. As aforementioned, $\widehat{N}_s$ is available from register 876 of Target Estimator 86.

Referring now to FIG. 6C, Arithmetic Logic 88 operates basically as follows. Counter 880 continuously counts the digital output pulses from crossover detector 23 of ring laser 10. Initially, the channel between sequence generator 881 and buffer register 882 is closed, while the channels to register 883 and 884 are open. At the appropriate time, signal X from Threshold Detector 81 activates sequence generator 881 which transmits a pulse through this closed channel to register 882 commanding it to sample and store the count $\eta_1$ of counter 880. The channel between sequence generator 881 and register 882 is then opened, while that to register 883 is closed. Signal W from Target Estimator 86 activates sequence generator 885 which commands register 886 to sample and store the number $\widehat{N}_{s1}$ in register 876 of Target Estimator 86, and to transmit signal Z to clear the aforementioned register 876. (Initially, the channel between sequence generator 885 and register 886 is closed while the channels to registers 887 and 888 are open.) The channel between sequence generator 885 and register 886 is then opened while that to register 887 is closed.

The aforementioned procedure is repeated upon reception of a second set of X and W signals, resulting in the count $\eta_2$ stored in buffer register 883 and the number $\widehat{N}_{s2}$ stored in buffer register 887. The channel between sequence generator 881 and register 883 is open and that to register 884 is closed. Likewise, the channel from sequence generator 885 to register 887 is open and that to register 888 is closed. The same procedure is repeated upon reception of a third set of X and W signals, resulting in the count $\eta_3$ stored in register 884 and the number $\widehat{N}_{s3}$ stored in register 888.

The channels from sequence generator 881 to register 884 and from sequence generator 885 to register 888 are thereupon opened, and those channels from sequence generator 881 to register 882 and from sequence generator 885 to register 886 are again closed. A signal is transmitted from register 884 to counter 880, resetting it to zero and causing it to begin counting again. Simultaneously, a signal is generated by register 888 enabling adders 889, 890, and 891 which, in turn, sum the contents of register pairs 882 and 886, 883 and 887 and 884 and 888, respectively. Enabling commands from adders 889 through 891 are also coupled to AND gate G2 which, in turn, activates adders 892 and 893. The output from adders 889 and 890 are summed by adder 892 and the result fed to multiplier 895. The outputs from adders 889 and 891 are summed by adder 893, the reciprocal of the result is taken by logic 894 and fed to multiplier 895. Responsive to a pulse from AND gate G3, multiplier 895 is estimated and the product fed to multiplier 896 where it is converted into radians, and the output angle $\hat{\phi}$ is stored in register 897a.

Where, for increased accuracy and to eliminate extraneous threshold effects, it is desired to obtain an average value of $\phi$, the aforementioned procedure is repeated, angle $\hat{\phi}$ in register 897a is shifted to register 897b, a new angle $\hat{\phi}$ is stored in register 897c and the process repeats for the required numbers of registers from 897a to 897k, where k is any number of repetitive units from one to infinity.

Embodiment for high optical intensity targets

At higher target light intensities, i.e., greater than $10^8$ photons per second, the output of photodetector 72 is a continuous current when it is illuminated by the target image spot. If the background output of photodetector 72 is low enough to occur as digital events, it will usually be of negligible consideration to the estimation process. In those applications where the background output of photodetector 72 is also a continuous current, the combination Threshold Detector-Background Estimator configuration of FIG. 7 is employed to present background data to the Target Estimator of FIG. 7A. The configuration of the arithmetic logic is identical to that shown in FIG. 6C for both the high and low optical intensity applications.

Briefly, the analog output of photodetector 72 is converted by analog-to-digital converters into a digital form, and the processes of target estimation are accomplished with binary logic.

The additional number of digital counts $\overline{N}_s$ estimated between the time the target threshold detection occurred and the time the coincidence between target image "center of gravity" and second slit center is estimated to have occurred is $$\widehat{N}_s = \frac{\int_0^{N_a} N(I-I_B)dN}{\int_0^{N_a} (I-I_B)dN} \qquad \text{Eq. 7}$$

Since the crossover detector 23 output is digital, the above analog expression is approximated in the digital form $$\widehat{N}_s \simeq \frac{\sum_{j=1}^{n} N_j \frac{(I-I_B)_j + (I-I_B)_{j-1}}{2}}{\sum_{j=1}^{n} \frac{(I-I_B)_j + (I-I_B)_{j-1}}{2}} \qquad \text{Eq. 8}$$

where $(I-I_B)_k$ is the difference between the photodetector current and the photodector current in the presence of background only at the occurrence of the $k^{th}$ ring laser digital count after threshold detection. The approximation is sufficiently accurate because $n$ will be greater than 100, i.e., as the target image crosses the second slit, more than 100 ring laser output counts will occur. The background estimate, $I_B$, is measured prior to threshold detection of the target image and is mathematically $$I_B \simeq \frac{\sum_{j=0}^{N_w} I_j}{N_w} \qquad \text{Eq. 9}$$

The sequence of operations leading to the background number $I_B$ is as follows with reference to FIG. 7. The analog output I from photodetector 72 is converted into binary pulses via analog-to-digital converter 841. At each digital pulse from crossover detector 23, signal C1 commands adder 843 which adds the contents of buffer register 845 with the binary output from counter 841. The sum is shifted to register 847, register 845 is cleared by signal C2 from adder 843 and the count in register 847 is shifted into register 845 at signal C3. The above procedure is repeated at each ring laser output pulse.

Concurrent with the aforementioned procedure, counter 849 is counting digital pulses from the output of crossover detector 23. When counter 849 has counted up to the preselected number $N_w$, it generates signal C4, clears itself and proceeds to count from zero to $N_w$ again. This cycle is continuously repeated. Signal C4 activates multiplier 851 which multiplies the contents of register 845 by $1/N_w$, and the product is shifted into register 853. Register 845 is then cleared by signal C5. Signal X from counter 813 (at $N_{t1}$) shifts the binary number then present in register 853 into register 855 for sampling by the target estimator.

Threshold detection is effected by the circuit of FIG. 7 as follows. The preselected threshold value $I_t$ is subtracted from the count in counter 841 via adder 811. A positive output from adder 811 enables counter 813 which counts from zero to $N_{t1}$ to $N_{t2}$ and then stops and clears itself.

When counter 813 reaches $N_{t1}$, a signal from the X output is transmitted, as aforementioned, to register 855. ($N_{t1}$ is the number of digital counts that must occur from detection of the target image in the first slit until the target image is halfway between the first and second slits.) When the target reaches $N_{t2}$, a signal from the Y output is transmitted to register 855, clearing the contents thereof. ($N_{t2}$ is the number of digital counts that must occur from detection of the target image in the first slit until the target image has passed the second slit by a distance equal to half the spacing between the first and second slits.)

Referring now to FIG. 7A, target estimation is effected as follows. The current I from photodetector 72 is converted into binary form via analog-to-digital converter 861. A signal from the X output of counter 813 (FIG. 7) activates register 863 causing it to continually sample converter 861 until the arrival of a signal from the Y output of counter 813 which stops and clears register 863. Each output pulse from crossover detector 23 causes adder 867 to sum the count in buffers 863 and 865. After summation the count in register 863 is shifted and stored in register 865 until receipt of the next ring laser digital output pulse.

The output of adder 867, in turn, is multiplied via multiplier 869 by the fraction ½, and the product is transmitted both to adder 900 and adder 910. The product is added in adder 910 to the negative of the number $I_B$ store in register 855 of the combination threshold detector-background estimator of FIG. 7. The output of adder 910 is multiplied via multiplier 911 by the number of ring laser counts stored in counter 912. (Counter 912 begins its count upon reception of the signal from the X output of counter 813 of the combination threshold detector-background estimator shown in FIG. 7.) The product of multiplier 911 is added in adder 913 to the number stored in register 914, and the sum is first transmitted to register 915 and then shifted therefrom to register 914.

Simultaneously with this operation, the product of multiplier 869 is also transmitted to adder 900 where it is added to the number stored in register 901, the sum being transmitted to register 902 and then shifted into register 901.

Upon the occurrence of a signal from the Y output of counter 813 of the combination threshold detector-background estimator, the output of counter 912 is multiplied by the background estimate $I_B$ from register 855 via multiplier 916. The contents of register 901 is then added to the negative of the output of multiplier 916 via adder 903, and the reciprocal of the resulting sum is then taken in reciprocal logic 904. The output of register 914 is then multiplied with the output of reciprocal logic 904 in multiplier 918 whose output, in turn, is stored in register 920 for subsequent utilization by Arithmetic Logic 88.

Shaft-position transducer

Figure 8:
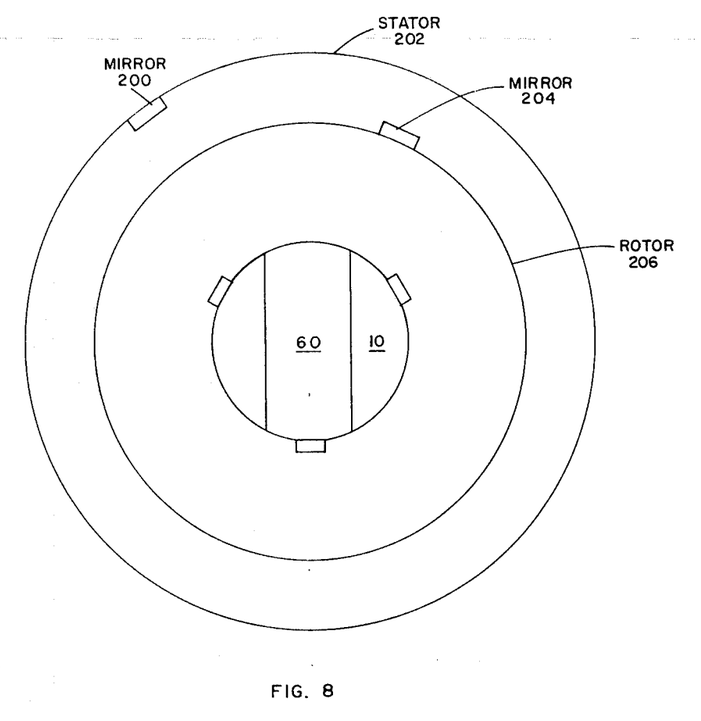
FIG. 8 is a functional diagram of the encoder when configured as a shaft position transducer.

When the invention functions as a shaft-position transducer, as in a resolver, the system is configured as illustrated in FIG. 8. As noted therein, mirror 200 is mounted on stator 202, and mirror 204 is mounted on rotatable rotor 206. The encoder, which is preferably mounted within rotor 206, rotates independently of rotating rotor 206. In such applications, the autocollimation capability is employed. Here, a spot of light generated by pen light 76 within container 70 emerges through a slit on the container and is reflected and collimated by paraboloid reflector 62 out of photometer 60 in the form of a plane wave. When the plane wave and the surface of one of the mirrors are coincident, the wave is reflected back to the paraboloid reflector of photometer 60 and refocused to an image spot which sweeps across the system of slits on container 70, and the above described estimating-detecting occurs. Here, mirrors 200 and 204 represent targets $T_1$ and $T_2$, respectively, and no external light source is needed. The result is a precise measurement of the angular difference through which rotor 206 has moved relative to stator 202.

Additional comments

It is understood that the particular logic components used to implement the velocity stabilization feedback loop and the preferred configurations of the Estimator-Detector may be replaced with other more sophisticated devices and yet still remain within the intended scope of the invention. Further, although two aperture slits are shown on container 70 of the scanner-photometer, additional slits may be employed. The estimation uncertainties are inversely proportional to the square root of the number of slits times the number of scans made.

Having thus described our invention, we claim:

1. An angle encoder for sequentially measuring and encoding the angular difference $\phi$ in inertial positions of a target $T_2$ relative to another target $T_1$, wherein said targets emit light of an approximately known intensity, said encoder comprising in combination:
   (a) a ring laser comprising a gas-filled resonant cavity containing two oppositely directed optical waves having a beat frequency indicative of the inertial rotation rate of said ring laser about a rotation axis, said laser further comprising a first photodetector which generates an alternating current waveform having a frequency $f_m$ proportional to said beat frequency;
   (b) an analog-to-digital encoder coupled to said first photodetector for converting said alternating current waveform into a series of output pulses having a frequency of occurrence proportional to said beat frequency;
   (c) a feedback control loop coupled to said ring laser which operates to rotate said ring laser at a constant reference inertial angular rotation rate through a cycle of 360°;
   (d) a photometer rigidly affixed to said ring laser and rotatable therewith about said rotation axis, said photometer having an optical axis within the plane of rotation of said ring laser, wherein said photometer sequentially scans, through said cycle of 360° said target $T_1$, said target $T_2$, and again said target $T_1$, said photometer further comprising means for generating an electrical output signal directly proportional to said light intensity from each of said targets; and
   (e) an estimator-detector circuit coupled to said photometer and to said analog-to-digital encoder, said estimator-detector comprising means for estimating when said output signal from said photometer exceeds a predetermined threshold value, thereby indicating the presence of one of said targets, means for estimating the laser pulse count $N_1$, $N_2$, $N_3$ from said analog-to-digital encoder occurring when said optical axis of said photometer coincided with the optical center of each of said targets $T_1$, $T_2$, and $T_1$ again, respectively, and arithmetic means for calculating and generating an output signal $$\phi = \frac{N_2 - N_1}{N_3 - N_1} 2\pi$$

2. The angle encoder of claim 1 wherein said alternating current waveform from said first photodetector has an amplitude having a zero crossover point and wherein said analog-to-digital encoder generates one of said output pulses each time that said alternating current waveform goes through said zero crossover point with positive slope.

3. The angle encoder of claim 1 wherein said feedback control loop comprises a pre-amplifier coupled to said first photodetector which continuously amplifies said alternating current waveform from said first photodetector, an oscillator which generates a reference alternating current waveform having a frequency $f_r$ corresponding to said reference inertial angular rotation rate, a phase-sensitive detector which compares said frequencies $f_m$ and $f_r$ and generates a difference signal, a power amplifier which amplifies said difference signal, and a torquer coupled to said power amplifier and to said laser which, responsive to said amplified difference signal, causes said laser to rotate at an angular rotation rate to reduce to zero the difference between said frequencies $f_m$ and $f_r$.

4. The angle encoder of claim 1 wherein said reference inertial angular rotation rate is high enough to reduce to a tolerable degree the non-linear dependence of said beat frequency on said laser's rotation rate.

5. The angle encoder of claim 1 wherein said photometer further comprises focusing optics which defines said optical axis and a plate having inscribed thereon at least two slits positioned at the focal point of said focusing optics, wherein incoming light is focused by said focusing optics into an image spot on said plate, said spot being swept across said slits as said photometer rotates, and wherein said signal generating means is a second photodetector positioned behind said plate on the side opposite said focusing optics which generates said output signal responsive to said image spot incident on said second photodetector through said slits.

6. The angle encoder of claim 5 wherein said photometer further comprises a housing containing said focusing optics, said plate, and said second photodetector, said housing having an aperture on the surface facing said focusing optics and disposed about said optical axis for the reception of incoming light, the inner surfaces of said housing being baffled against stray light.

7. The angle encoder of claim 6 wherein said photometer further comprises means for generating a beam of autocollimated light through one of said slits to said focusing optics.

8. The angle encoder of claim 6 wherein said light intensity from said targets is greater than approximately $10^8$ photons per second and wherein said output from said second photodetector is a continuous current having a frequency proportional to said light intensity.

9. The angle encoder of claim 6 wherein said light intensity from said targets is less than approximately $10^8$ photons per second and wherein said output from said second photodetector is a series of random current pulses having an output count within a discrete time interval proportional to said light intensity.

10. The angle encoder of claim 1 wherein said estimator-detector circuit further comprises means for estimating the average intensity of background light within the plane containing said targets being scanned and means for minimizing the effects of said background light in estimating the center of each of said targets.

References Cited

UNITED STATES PATENTS 3,469,922  9/1969  Coccoli et al. ________ 356—106

OTHER REFERENCES

Klass, "Laser Unit Challenges Conventional Gyros," Aviation Week and Space Technology, September 1966, p. 103–113.

RODNEY D. BENNETT, Jr., Primary Examiner

S. BUCZINSKI, Assistant Examiner

U.S. Cl. X.R.

356—141, 106; 250—231